United States Patent [19]
Teigen et al.

[11] Patent Number: 5,275,644
[45] Date of Patent: Jan. 4, 1994

[54] STEAM SEPARATING APPARATUS

[75] Inventors: Bard C. Teigen, Enfield; H. Rodolfo Akel, Suffield; Paul S. Zymba, Enfield, all of Conn.; John M. Banas, Warren, Mass.; James S. Tollo, Enfield, Conn.; Craig Bradley, Guilford, Conn.; Joe B. Lindsay, Jr., East Hampton, Conn.; Benjamin F. Love, Weatogue, Conn.

[73] Assignee: Combustion Engineering, Inc., Windsor, Conn.

[21] Appl. No.: 997,072

[22] Filed: Dec. 29, 1992

[51] Int. Cl.⁵ .................. B01D 19/00; B01D 45/08
[52] U.S. Cl. ........................ 96/190; 55/320; 55/329
[58] Field of Search ............. 55/185, 186, 204, 440, 55/442, 443, 444, 464, 176, 177, 320, 329; 122/488, 489, 490, 491; 210/512.1, 512.3; 96/190

[56] References Cited

U.S. PATENT DOCUMENTS 3,165,387  1/1965  Place .
4,182,277  1/1980  Burton et al. .
4,483,696  11/1984  Zipay et al. .

OTHER PUBLICATIONS

Singer, Joseph G.; Combustion-Fossil Power Systems, Combustion Engineering, Inc., 1981, pp. 5-24 to 5-31, 7-14 to 7-16 and 8-9.

*Primary Examiner*—Frank Sever
*Attorney, Agent, or Firm*—Chilton, Alix & Van Kirk

[57] ABSTRACT

A liquid-vapor separator for two-phase fluids in general and specifically a steam-water separator in a steam drum of a steam generator includes axial or radial spinner blades to create a centrifugal motion which causes liquid to be forced outward against the outer wall and the vapor to be concentrated in the center. Conical extraction skimmers systematically extract and discharge the liquid outwardly and downwardly through the side walls such that it impinges on an oval discharge screen surrounding the skimmers. The vapor flows out the top through a central opening and enters a secondary separator packed with crimped wire mesh encased in a perforated enclosure.

9 Claims, 3 Drawing Sheets

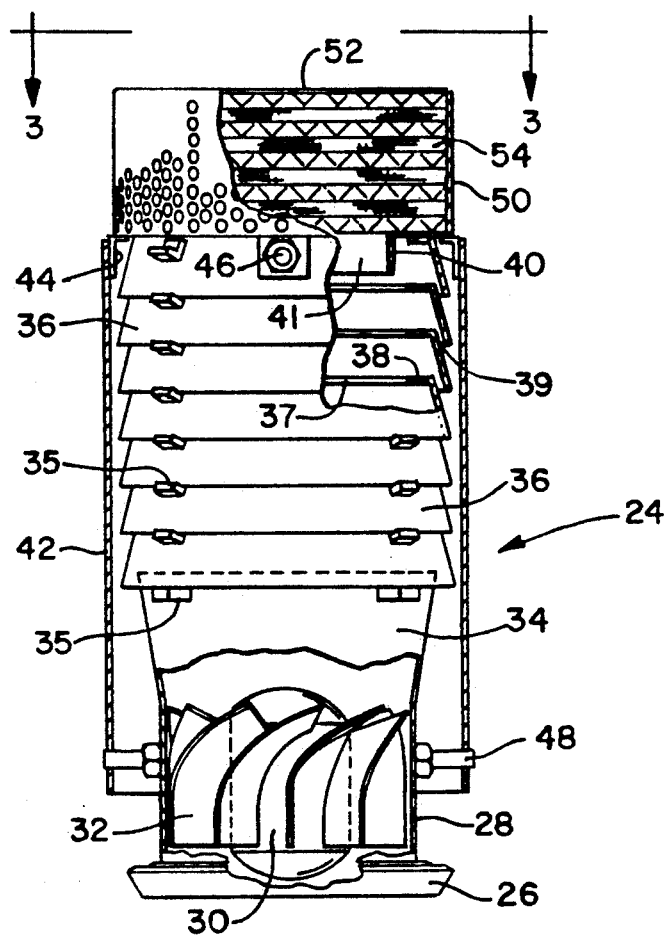
FIG. 2
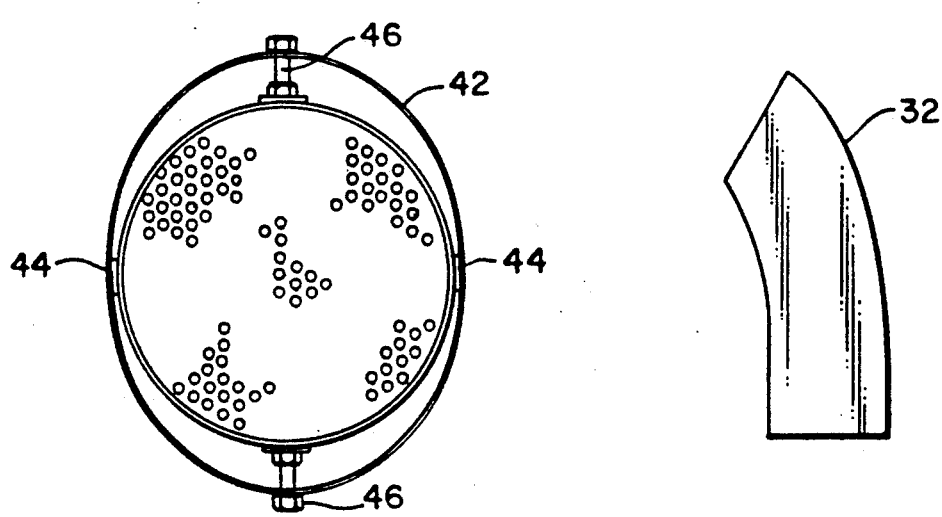
FIG. 3
FIG. 4

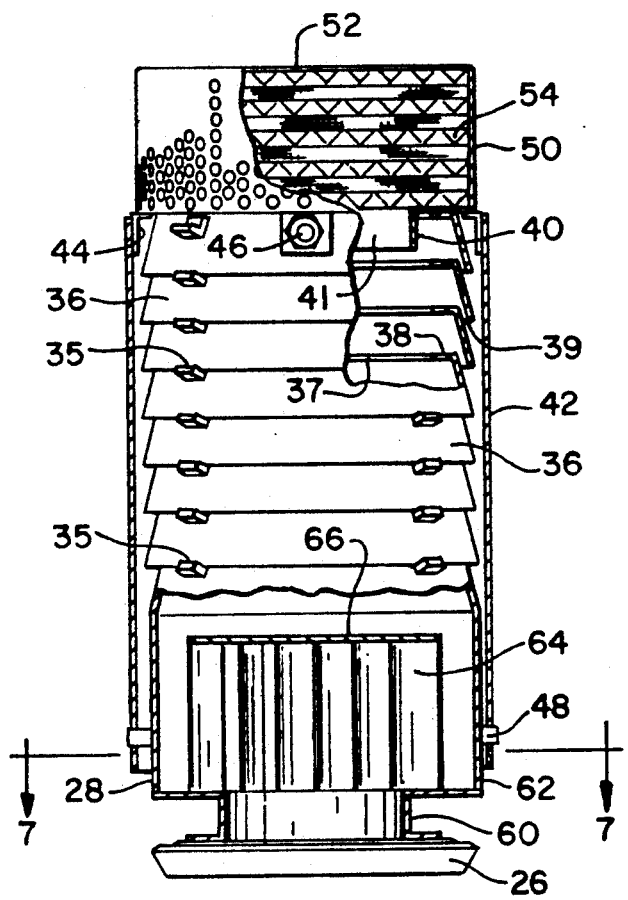
FIG. 6
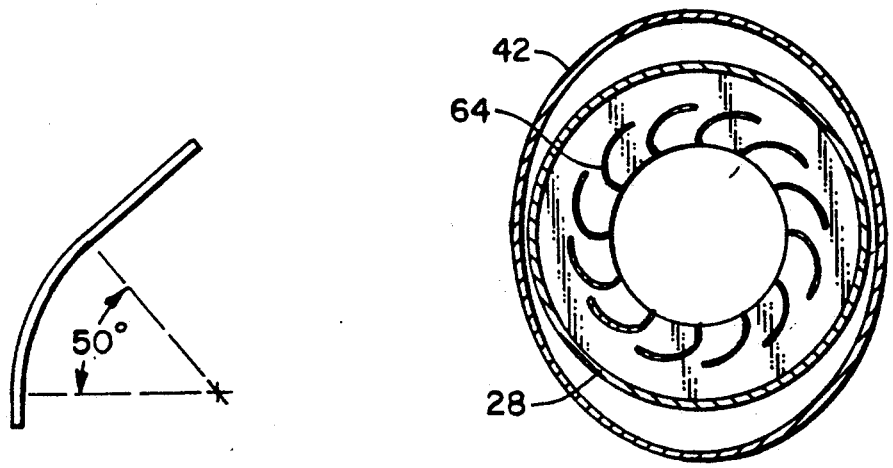
FIG. 5
FIG. 7

STEAM SEPARATING APPARATUS

BACKGROUND OF THE INVENTION

This invention relates to the field of separating vapors from liquids in many two-phase mixtures such as separating steam from water in a boiler or other two-phase mixtures such as natural gas and hydrocarbons. More particularly, the invention relates to steam drum internals for separating and drying steam.

Steam generated in a subcritical pressure drum type boiler is intimately mixed with large and variable amounts of circulating boiler water. Before the steam leaves the boiler and enters the superheater, practically all of this associated boiler water must be separated from the steam. This separation must be done within a limited space in the steam drum, within a matter of seconds and under a variety of velocity, pressure and other operating condition. The pressure drop across the steam and water separators must be kept to a minimum so as not to affect the boiler circulation or water level controls. Despite many theoretical analyses of steam and water separation and a great number of hypotheses to explain these phenomena, steam and water separation in boilers retains many aspects of an art and has thus far defied complete mathematical representation.

Nearly all of the liquid and solid impurities in the steam and water mixture must be separated from the steam before it is suitable for use. Any unseparated liquid in the steam contains dissolved and suspended salts which appear as a solids impurity in the steam when the moisture is evaporated in the superheater or it is directed to a turbine or other steam driven apparatus.

The drum of a subcritical pressure boiler serves several functions, the first being that of collecting the mixture of water and steam discharged from the boiler circuits. Also, the drum houses equipment to separate the steam from the water and then purify the steam after it has been separated. The drum internals in subcritical pressure boilers not only separate water from steam but also direct the flow of water and steam to establish an optimum distribution of fluids in the boiler during all loads of boiler operation. The internals may consist of baffles which change the direction of flow of a steam and water mixture, impellers and separators which use a spinning action for removing water from steam or moisture coalescers such as screen and corrugated plate final dryers. These devices are used singly or in consort to separate and purify the steam and remove impurities from the steam leaving the boiler drum.

The space required to accommodate steam separating and purifying equipment determines drum size. Drum diameter and length should be sufficient to provide accessibility for installation and inspection and for processing the maximum flows of water and steam. Providing sufficient drum diameter and length to provide this accessibility while still maintaining a drum of a reasonable size is a significant challenge to the designer of drum internals.

SUMMARY OF THE INVENTION

It is therefore an object of the present invention to provide a vapor separating apparatus which will afford efficient and effective separation and drying within a minimum space and with a relatively low pressure loss. More particularly, the present invention relates to a primary and secondary separator including means for centrifugal separation, skimmers to direct liquid downwardly and a discharge screen to reduce the velocity of the discharged liquid, release vapor from the surface of the droplets and minimize disruption of the liquid pool. The invention is particularly applicable to the separation of steam from water and separating and purifying other vapors from two-phase mixtures such as liquid and gaseous hydrocarbons.

BRIEF DESCRIPTION OF THE DRAWINGS

FIG. 2 is a vertical cross section view of one embodiment of the separator;

FIG. 3 is a top view of the separator shown in FIG. 2.

FIG. 4 is a face view of a spinner blade in the unbent state;

FIG. 5 is an edge profile of a bent spinner blade;

FIG. 6 is a vertical cross section view of an alternate embodiment of the separator;

FIG. 7 is a cross section view taken along line 7—7 of FIG. 6.

DESCRIPTION OF THE PREFERRED EMBODIMENT

Figure 1:
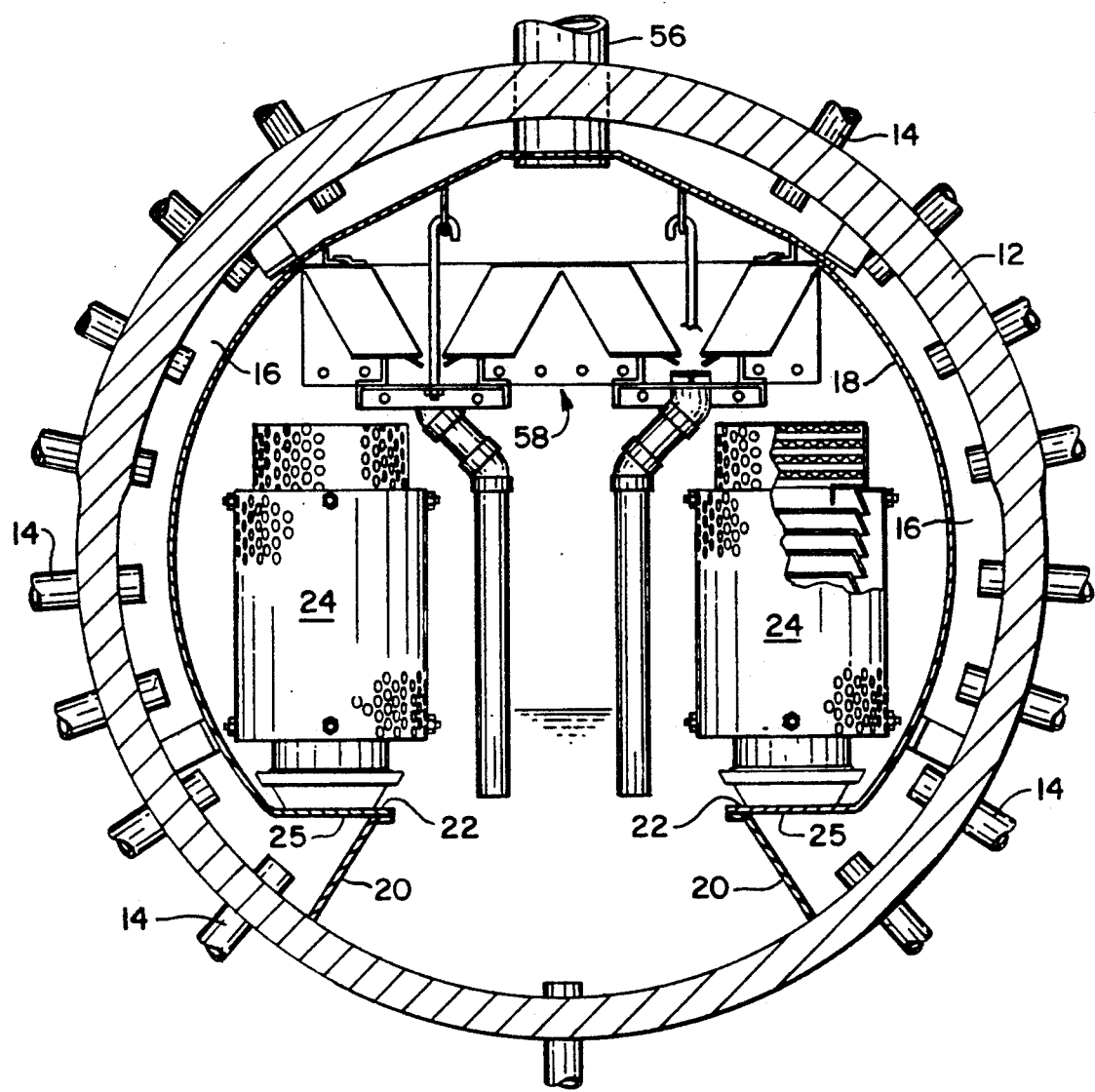
FIG. 1 is a vertical cross-sectional view of a steam drum incorporating the steam separator of the present invention partially broken away.

Although the invention is applicable to the separation of various liquid-vapor mixtures as previously stated, the invention will be described with particular reference to steam drums and the separation of water and steam.

Referring specifically to FIG. 1 of the drawings, the drum 12 is the conventional steam drum configuration with an elongated cylindrical shape and disposed with its axis parallel to the horizontal. The drum 12 is penetrated by riser pipes 14 which receive the steam/water mixture from the steam generator and discharge this mixture into the annular space 16 between the drum liner or baffle 18 and the drum 12. Although the riser pipes 14 have been illustrated as being distributed rather uniformly around the annular space 16, the actual sections of the drum penetrated by the risers is a variable that depends on the drum operating pressure, the type of furnace circulation and the mass loading of steam and water into the drum. The baffle 18 is closed off at the bottom ends by the baffle portions 20 and the baffle includes the horizontal ledge portions 22. This baffle 18 including its portions 20 and 22 extends the full length of the drum thereby providing the enclosed annular space 16.

Mounted on the baffle ledge portions 22 are a plurality of steam separating units 24 in two horizontally extending rows on either side of the axis of the drum. Although two rows have been illustrated, there may be more than two. Each row would contain as many separators as desired and would be dependent on the drum size and capacity. The steam separators 24 are mounted over apertures 25 in the baffle ledge portions 22 thereby directing the flow of the steam-water mixture from the pipes 14 into the annular space 16 and then up through the apertures 25 in the baffle ledge portions 22 and into the interior of the separators 24.

Referring now to FIG. 2, the base of the separator is a cast steel support ring 26 with the circular spinner housing 28 welded on top. Contained within the housing 28 is a core 30 which is a cylindrical member having domed top and bottom ends. The bottom domed end has a hole for pressure equalizations. Located in the annular space between the core 30 and the housing 28 are the spinner blades 32. These spinner blades 32 are welded to the core 30 and to the housing 28 to form a unitary spinner unit. The profiles and discharge angles of the spinner blades 32 can be optimized to enhance the centrifugal motion of the steam/water mixture. The profile and discharge angle of the blades depends on the composition and thermophysical properties of the liquid-vapor mixture being separated. Although these details may vary for any specific situation, FIGS. 4 and 5 illustrate one example of a blade configuration for a spinner housing having a diameter of 21.6 cm (8.5 inches) and a height of 14 cm (5.5 inches) and a core having a diameter of 10 cm (4 inches). FIG. 4 illustrates the blade template in the unbent state and FIG. 5 illustrates the bent profile with a 50° bend. These dimensions for the spinner housing and blade configuration are only by way of example and the invention is not limited to any specific dimensions or angles. The centrifugal motion imparted to the mixture causes liquid to be forced against the outer wall of the separator and the vapor to move to the center.

Attached to the top of the spinner housing 28 is a conical diffuser section 34 which has a larger diameter at the top than the bottom. This diffuser section reduces the momentum of the separated mixture as it travels upward because of the increased cross-sectional flow area. This loss of momentum further enhances the separation.

As an example only, the diffuser section for the spinner housing dimensions given above would have a bottom diameter of 21.6 cm (8.5 inches), a top diameter of 25.4 cm (10 inches) and a height of 10.8 cm (4.25 inches). The height of the diffuser section is optimized depending upon the mixture being separated and the separation of hydrocarbons or other vapor-liquid mixtures may require a different height.

Located above the diffuser section 34 are a series of formed liquid extraction skimmers 36. These extraction skimmers are conical in shape with the major central portion of the upper surface being open to form the aperature 37 and the remaining extraction lip 38. This extraction lip 38 is in the form of an annular inwardly extending portion which tends to trap the liquid droplets as they flow up along the inside surface. These droplets then flow down and out the open area 39 between adjacent skimmers. Each extraction skimmer 36 is supported by the extraction skimmer underneath by means of welding to the brackets 35 which are spaced around each extraction skimmer and also spaced around the diffuser section 34. The liquid water which has been concentrated on the walls by the centrifugal action is directed downward and outward by means of these extraction skimmers 36 and their extraction lips 38. The amount of liquid extraction at each point along the separator height is controlled by the amount of open area 39 between skimmers which is set by the location of the brackets 35.

Attached on top of the uppermost extraction skimmer 36 is a cap or cover 40 which has a central opening 41. This forms an annular barrier to the upward flow of water droplets along the wall while providing a central opening for the upward flow of vapor.

Surrounding the extraction skimmers 36 is a perforated water discharge screen 42 which is oval- or elliptically-shaped in cross section as seen in FIG. 3. Again by way of example only, this discharge screen has holes which are preferably about 0.97 cm (0.38 inches) in diameter and staggered on 1.4 cm (0.56 inches) centers producing a screen which is approximately 40% open area. At the top of the discharge screen, the narrow diameter is attached at 44 to the outside diameter of the cap or cover 40 while the large diameter is attached to the adjusting bolts 46. These adjusting bolts hold the large diameter in place and spaced from the outside diameter of the extraction skimmers. Similar adjusting bolts 48 are located around the bottom of the discharge screen to hold it in place spaced from the housing 28.

The liquid droplets flowing downward and outward from the extraction skimmers 36 tend to be thrown against this perforated water discharge screen 42. The discharge screen confines the water droplets and further reduces their velocity. This minimizes disruption of the liquid pool in the bottom of the drum and reduces re-entrainment of vapor into the liquid water. Furthermore, it minimizes the entrainment of vapor in the liquid water droplets since vapor tends to be released upon impact with the discharge screen.

The separators are arranged in the steam drum such that the long dimension of the oval discharge screen is across the steam drum. Therefore, the plurality of separators in each row can be placed close to each other making them closely packed. However, there must be sufficient open area between the skimmers 36 and the discharge screen 42 to permit liquid flow downward and free vapor flow upwardly. This required open flow area is provided by the oval shape.

The vapor which has thus far been separated from the liquid flows up through the opening 41 in the cap or cover 40 and enters the secondary separator section. This secondary separator section has a perforated cylindrical container 50 and a round perforated cover 52. Stacked inside the container 50 are layers of crimped wire mesh 54 with each layer being oriented with respect to the adjacent layer such that the crimps are perpendicular as shown in FIG. 2. A preferred material is a 6 mesh screen with wire having a diameter of 0.12 cm (0.047 inches). The vapor passes through the wire mesh and out the perforations while the liquid droplets tend to be deposited on the wire mesh and then flow out through the side perforations in the container 50 and down the outside of the primary separator section.

The vapor (steam) coming from the tops of the separators 24 enters the vapor space around and above the separators and flows upward toward the steam outlet 56. Between the separators 24 and the steam outlet 56 is the final steam dryer generally designated as 58. Final steam dryers are conventional and any desired design may be used in conjunction with the separators of the present invention. Therefore, the specific details of the final steam dryer have not been described.

Referring now to FIG. 6, a separator is illustrated with a modified spinner design. The base of the separator is a cast steel support ring 26 with the circular spinner housing 28 welded on top. This spinner housing has a narrow throat section 60 and an enlarged section 62. Mounted within the enlarged section over the throat section are the profiled radial spinner blades 64. The configuration of these spinner blades is shown in FIG. 7. The tops of the spinner blades are covered by the plate 66. It can be seen that the liquid-vapor mixture that enters up through the throat section 60 will be forced radially outward with a spinning motion. This will produce a centrifugal motion as the mixture moves upwardly. This centrifugal motion causes the liquid to be force out against and up the wall and the vapor to move to and up through the center of the separator. From that point, the separator is constructed and operates in the same way as the first embodiment.

While certain embodiments of the present invention have been shown and described, these are intended to be by way of example and are not intended to limit the scope of the invention as claimed.

We claim:

1. A vapor-liquid mixture separator comprising components including
   a. a base having a central inlet in the bottom of said separator;
   b. spinner means located over said central inlet and attached to said base adapted to cause a vapor-liquid mixture flowing up through said inlet to spin outwardly;
   c. A circular housing surrounding said spinner means and attached to said base;
   d. a plurality of extraction skimmer sections supported above said circular housing, each extraction skimmer section comprising a conical section having a large lower diameter and a smaller upper diameter and with the large lower diameter of each conical section extending partially down over the smaller upper diameter of the conical section below; whereby separated liquid along the outside is thrown outwardly and downwardly between adjacent skimmer sections;
   e. a cover attached over the uppermost of said skimmer sections comprising an annular ring to block flow of separated liquid upward along the outside and a central outlet to permit flow of separated vapor through the center, and
   f. a perforated discharge screen surrounding said skimmer sections and spaced generally outwardly therefrom whereby at least a portion of said liquid thrown outwardly from said extraction skimmer sections impinges on said discharge screen; said components being sized, spaced and dimensioned to provide accessibility for installation and inspection, and for maximum liquid and vapor flow and separation, when installed in a drum.

2. A vapor-liquid mixture separator as recited in claim 1 wherein said skimmer sections are circular-shaped and said discharge screen is oval-shaped.

3. A vapor-liquid mixture separator as recited in claim 1 and further including a secondary separator mounted on top of said separator above said central outlet.

4. A vapor-liquid separator as recited in claim 3 wherein said secondary separator contains a plurality of layers of crimped wire mesh.

5. A vapor-liquid separator as recited in claim 4 wherein said layers of crimped wire mesh are oriented with said crimps in each layer being perpendicular to said crimps in adjacent layers.

6. A vapor - liquid separator as recited in claim 3 wherein said secondary separator is contained within a perforated plate cylinder.

7. A vapor-liquid separator as recited in claim 1 wherein said spinner means comprises:
   a. a central core located in the center of said circular housing forming an annular flow channel between said central core and said circular housing;
   b. a plurality of spinner blades spaced generally uniformly around said annular flow channel and attached between said central core and said circular housing; said spinner blades having bottom portions extending generally vertically and upper portions being bent at an angle thereto whereby flow of said vapor-liquid mixture is caused to spin axially upward through said annular flow channel.

8. A vapor-liquid separator as recited in claim 7 and further including a conical diffuser section attached to the top of said circular housing above said annular flow channel and diverging outwardly whereby the flow area for said axially spinning mixture is increased.

9. A vapor-liquid separator as recited in claim 1 wherein said spinner means comprises:
   a. a central open area in said circular housing;
   b. a plurality of spinner blades spaced generally uniformly around said central open area and spaced inwardly from said circular housing, said spinner blades extending generally radially outward in a spiral pattern, said spinner blades and said central open area being closed at the top whereby flow of said vapor-liquid mixture is caused to spin radially outward towards and around said circular housing.

* * * * *